United States Patent
Watanabe et al.

(10) Patent No.: US 7,061,863 B2
(45) Date of Patent: Jun. 13, 2006

(54) DATA COMMUNICATION SYSTEM, DATA RECEIVING TERMINAL AND DATA SENDING TERMINAL

(75) Inventors: Hideaki Watanabe, Kawasaki (JP); Takashi Hamano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1002 days.

(21) Appl. No.: 09/735,887

(22) Filed: Dec. 13, 2000

(65) Prior Publication Data

US 2001/0004352 A1 Jun. 21, 2001

(30) Foreign Application Priority Data

Dec. 20, 1999 (JP) .......................................... 11-361256

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)

(52) U.S. Cl. ...................... 370/232; 348/390.1; 714/18; 725/115

(58) Field of Classification Search ............. 348/384.1, 348/390.1, 394.1, 400.1, 410.1, 425.2; 370/231, 370/232, 234, 236, 253, 352, 465, 468, 477, 370/521; 455/442–446, 556.1, 556; 704/201, 704/500; 714/2, 18, 20, 48, 49, 50, 52; 725/92, 725/93, 95, 96, 115, 116, 117

See application file for complete search history.

(56) References Cited

U.S. PATENT DOCUMENTS

| 5,903,673 A | * | 5/1999 | Wang et al. ................. 382/236 |
| 6,587,985 B1 | * | 7/2003 | Fukushima et al. .......... 714/748 |
| 6,637,031 B1 | * | 10/2003 | Chou ........................... 725/87 |

FOREIGN PATENT DOCUMENTS

| JP | 7-75092 | 3/1995 |
| JP | 9-182055 | 7/1997 |
| JP | 10-164553 | 6/1998 |
| JP | 10-243373 | 9/1998 |

OTHER PUBLICATIONS

Notice of Ground of Rejection dated Jun. 29, 2005.
Yukinori Goto, et al. Study of Movie Application using RSVP. Graduate School of Information Science and Electrical Engineering, Kyushu University, Institute of Systems & Information Technologies / Kyushu. Nov. 6, 1997. vol.97, No. 104 ISSN 0919–6072.

* cited by examiner

*Primary Examiner*—Wellington Chin
*Assistant Examiner*—John Shew
(74) *Attorney, Agent, or Firm*—Katten Muchin Rosenman LLP

(57) ABSTRACT

At a data receiving terminal, if a received-data of a particular time section received from a data sending terminal does not satisfy a predetermined accumulation quality as the result of discrimination by a received-data quality discriminating section, an alternative-data sending requesting section requests a data sending terminal for alternative data satisfying the accumulation quality for the unsatisfied data of the particular time section. The result is that the data receiving terminal can realize both reproduction of data with less sending delay and accumulation of high-quality data.

13 Claims, 12 Drawing Sheets

DATA COMMUNICATION SYSTEM, DATA RECEIVING TERMINAL AND DATA SENDING TERMINAL

BACKGROUND OF THE INVENTION

1. Field of the Invention

The present invention relates to a data communication system and data receiving and sending terminals, and more particularly to a data communication system which enables real-time output and accumulation of received data concurrently at a data receiving terminal, and such data receiving and sending terminals.

2. Description of Related Art

FIG. 10 of the accompanying drawings is a block diagram showing a data communication system utilizing a TCP/IP (transmission control protocol/internet protocol). The data communication system 100 of FIG. 10 comprises a TCP/IP network 105, which is constructed by a plurality of communication networks 101 each according to TCP/IP and a plurality of routers 102, and a sending terminal 103 and a plurality of receiving terminals 104, which both terminals are connected to the TCP/IP network 105. For example, data of a particular service (e.g., VOD (video on demand)) can be delivered to the plural receiving terminals 104.

When the same data is sent (delivered) from a particular sending terminal 103 to the plural receiving terminal 104 in TCP/IP, it is customary not to increase the data sending amount of the sending terminal 103 even though increasing the number of the receiving terminals 104, employing a technology called "multicast"; sending data is not carried out for each and every receiving terminal 104.

Specifically, each router 102 grasps a network 101 where the terminals 104 to receive multicast data exist (are connected to); as a need arises, the router 102 copies the received multicast data and delivers the copy multicast data to another communication network 101. Accordingly, if the sending terminal 103 send multicast data only once, the multicast data is then copies by a necessary number and transferred at each router 102. Finally, multicast data for a necessary number of the receiving terminals 104 are generated in the TCP/IP network 105 for delivery to the individual receiving terminals 104.

In the TCP/IP network (hereinafter also called "network") 105, data obtained by the receiving terminal 104 would tend to lack in part as a sending error occurs for various causes during transfer of data. Such data loss in the network 105 can be solved using a resending process protocol (application) in TCP.

However, as shown in FIG. 11, if the data communication system 100 is in the form of an AV (audio and video) data (multimedia data) delivery system where AV data is sent from the sending terminal 103 to a particular receiving terminal 104 via the network 105 and is reproduced with real time and output to a display unit 104a and a speaker 104b at the receiving terminal 104, it is customary that a resending process is not carried out if possible because AV data has the following characteristics:

(1) Since AV data is very large in data amount, the load of data sending of the sending terminal 103 would increase in proportion to the number of receiving terminals 104 when the resending process is repeated. For the same reason, the network band would become heavy in traffic, giving a large influence on other data communications sharing the same network 105.

(2) Since the receiving terminal 104 cannot reproduce AV data until after completion of resending, a great time of delay would occur (meaning of real-time communication would become less significant).

(3) AV data can be treated as practically no problem as long as quality in reproduced image and voice is temporarily lowered by only small degrees despite occurrence of data lacking at the receiving terminal 104.

Therefore, AV data is sent occasionally using a protocol called UDP (user data gram protocol), which is a TCP/IP protocol family and devoid of resending control in method per se. But, even in the case using this UDP, an upper layer (e.g., an application layer) can be equipped with a data resending control function.

Given that the resending control function is thus equipped in data sending in UDP, a resending process would be practically impossible at a single sending terminal 103 when the number of the receiving terminals 104 increases. Consequently, in the multicast technology field, various methods called reliable multicast technologies have been proposed.

One example of such reliable multicast technologies is a method of reducing the frequency of a resending process at the individual sending terminal 103 by collecting resending requests from the individual receiving terminals 104 together temporarily in an apparatus located at the center of the network and then sending these resending requests to the sending terminal 103. Another example is a technology called "local repair" in which an apparatus (e.g., a router 102) located between the sending terminal 103 and the receiving terminal 104 (in the network 105) serves as an agent for the sending terminal 103 to resend requested resending data if the apparatus has such resending data.

In such AV data delivery system 100, when the sending terminal 103 sends the circumstance of a conference or image and voice information of a monitor camera as AV data to the receiving terminal 104 with real time, it is required that the delay time of data from when sent at the sending terminal 103 to when reproduced at the receiving terminal 104 should be reduced to a minimum. Particularly voice data must be sent without interruption; if an interruption occurs in received data, it results in reproduced sound with interruption so that the listener would feel an incompatibility.

However, when the network band is heavy in traffic as another data communication takes place using the same network 105, reduced sound would encounter an interruption at the receiving terminal unless the sending rate (sending data amount) of AV data is lowered, thus increasing the reproduction delay time by the interrupted time.

In order to avoid these circumstances, it is effective to provide the sending terminal 103 with a detector for detecting a possible heavy traffic in the network band to be used in transfer of AV data, and to control the sending rate of AV data at the sending terminal 103 when a usable band is narrowed.

Assume that the sending terminal 103 compresses and encodes voice data by sampling normally at 44.1 kHz and then sends the resulting voice data in 2 channels on stereo (256 kbps). During this data sending, when the sending terminal 103 has detected that the network band usable between the sending terminal 103 and the receiving terminal 104 has been narrowed, the sending terminal 103 downgrades the quality of the sending data stepwise from 2 channels on stereo (128 kbps) to monophonic (64 kbps).

Since the sending data amount from the sending terminal 103 is thereby reduced, it is possible to prevent any delay in reduced voice at the receiving terminal 104. Further, since the sending-data quality is downgraded stepwise, it is possible to have the listener be unconscious of changes in quality. Otherwise when the traffic of the network 105 restores, the sending-data quality is upgraded stepwise so that the data is reduced in original quality.

The above-mentioned method of reducing the sending data amount as the usable network band is narrowed is exemplified by Japanese Patent Laid-Open Publication No. HEI 7-75092, which discloses a method of reducing the resolution of motion image data with the sending rate kept unchanged. Namely, when the usable network band is narrowed, high-frequency components are cut off motion image data to be sent, thus restricting the range of frequency components of the sending data to reduce the sending-data amount per unit time.

Whether or not the network band usable in data sending has been narrowed (or widen) can be discriminated by measuring changes in the sending delay amount between the sending terminal 103 and the receiving terminal 104. As an example of this measuring method, it is known to utilize SR/RR (sender report/receiver report) packets in RTCP (real-time control protocol), which is a data transfer protocol family called RTP (real-time transport protocol). How to measure the sending delay will now be described with reference to FIG. 12.

First of all, the sending terminal 103 sends data called an SR (sender report) packet 112 periodically in parallel to sending ordinary AV data (packet) 111. In this SR packet 112, time information, indicating the time at which the SR packet 112 was sent from the sending terminal 103, is stored.

Upon receipt of the SR packet 112, the receiving terminal 104 generates an RR (receiver report) packet 113 in response to the SR packet 112 and sends (returns) the RR packet 113 to the sending terminal 103. At that time, the receiving terminal 104 stores in the RR packet 113 two kinds of information, i.e., (a) SR-packet-sending-time information stored in the SR packet 112 and (b) delay-time information indicating a period of time lapsed in the receiving terminal 104 from when the receiving terminal 104 received the SR packet 112 until when the receiving terminal 104 sends the RR packet 113 in response to the SR packet 112.

Finally, upon receipt of the RR packet 113 from the receiving terminal 104, the sending terminal 103 can obtain a round-trip sending-delay amount between the sending terminal 103 and the receiving terminal 104 by calculating the receiving time based on the following equation:

(round-trip sending-delay amount)=(RR-packet receiving time)−(SR-packet sending time stored in RR packet 113)−(delay time stored in RR packet 113)

Based on changes in the thus obtained round-trip sending delay amount between the sending terminal 103 and the receiving terminal 104, it is possible to discriminate whether or not the network 105 being used in sending AV data is becoming heavy in traffic. Further, by controlling the sending rate in such a manner that this sending delay amount is in a not-excessively-varying, stabilized state, it is possible to keep the reproduction delay time at the receiving terminal.

Then, in the above-mentioned AV data delivery system 100, as shown in FIG. 13, AV data received by a particular receiving terminal 104 is accumulated in an accumulating medium (received-data accumulating section) 104*c*, such as in the form of HDD (hard disc drive). Applications for taking out the accumulated AV data for reproduction and editing will be described later. The terminal(s) that accumulate the received AV data are one or more of all the receiving terminals 104.

This system construction is advantageous in a monitor system in particular. Namely, the sending terminal 103 sends data taken by a video camera installed at a monitoring point, and images and sounds reproduced with real time are monitored usually at the individual receiving terminals 104. When the occurrence of an abnormality has turned out, the receiving terminal 104 can subsequently reproduce to parse accumulated image and sound of the received data, which are accumulated in the accumulating medium 104*c*. Though illustration is omitted in FIG. 13, the same number of sending terminals 103 as that of the monitoring points are actually connected to the network 105.

However, also this monitoring system occasionally encounters a problem in that the receiving terminal 104 accumulating the received data would become unable to receive data in the originally required quality if the sending quality is changed at the sending terminal 103 in conformity with the traffic of the above-mentioned network 105 in an effort to improve the reproduction delay time at the receiving terminal 104.

This is true because, if the data is to be temporarily accumulated for subsequent use, it absolutely requires the condition that the originally necessary quality is kept throughout the entire data; though in real-time reproduction, as mentioned above, change in sound from stereo to monophonic or in encoding/sending rate from 256 kbps to 128 kbps would cause the reproduction quality to be downgraded only temporarily so that not-so-keep listeners would not feel an incompatibility.

Since the above-mentioned resending control function is originally to request for resending quite the same packet as the lost packet in the occurrence of a packet loss, it is impossible to make a resending request in accordance with such quality change.

SUMMARY OF THE INVENTION

With the foregoing conventional problems in view, a first object of the present invention is to provide a data communication system that realizes both reproduction of data with less sending delay and accumulation of high-quality data at a data receiving terminal.

A second object of the invention is to provide a data receiving terminal that realizes both reproduction of data with less sending delay and accumulation of high-quality data in a communication system.

A third object of the invention is to provide a data sending terminal that realizes both reproduction of data with less sending delay and accumulation of high-quality data at a data receiving terminal in a communication system.

In order to accomplish the above first object, according to a generic feature of the present invention, there is provided a data communication system having data sending and receiving terminals, the system comprising:

at the data receiving terminal (a) a received-data quality discriminating section for discriminating whether or not data to be received from the data sending terminal satisfies a predetermined accumulation quality;

(b) an alternative-data sending requesting section for, if the received data of a particular time section does not satisfy the accumulation quality as the result of discrimination by the received-data quality discriminating section, requesting the data sending terminal to send alternative data satisfying the accumulation quality for the data of the particular time section;

(c) a received-data accumulating section for accumulating the received data as judged satisfying the accumulation quality by the received-data quality discriminating section, and the alternative data as sent from the data sending terminal in response to the request by the alternative-data sending requesting section;

at the data sending terminal (d) an alternative-data sending request receiving section for receiving, from the alternative-data sending requesting section of the data receiving terminal, the request for sending of alternative data satisfying the accumulation quality;

(e) a sending-data accumulating section for accumulating data to be sent to the data receiving terminal as alternative data to be sent to the data receiving terminal in response to the sending request from the data receiving terminal; and (f) an alternative-data sending section for, upon receipt of the sending request by the alternative-data sending request receiving section, obtaining alternative data satisfying the accumulation quality from accumulated contents of the sending-data accumulating section and then sending the obtained alternative data to the data receiving terminal.

In this data communication system, since if the data of a particular time section the data receiving terminal from the data sending terminal does not satisfy the accumulation quality, the data receiving terminal requests the data sending terminal to send alternative data satisfying the accumulation quality for the data of the particular time section and obtains the alternative data, it is possible to accumulate data satisfying a predetermined accumulation quality all the time, thus realizing both reproduction of data with less sending delay and accumulation of high-quality data at the data receiving terminal.

As a preferable feature, the alternative-data sending requesting section is a differential-data sending requesting section for requesting differential data satisfying the accumulating quality as the alternative data by combining the data of a section unsatisfying the accumulation quality with the already received data.

With this arrangement, since the amount of data to be sent from the data sending terminal can be reduced, it is possible to minimize the network load, and the amount of data to be accumulated as alternative data at the data sending terminal.

As another preferable feature, the data sending terminal further comprises a sending-data quality information sending section for sending to the data receiving terminal sending-data quality information based on which the accumulation quality is to be discriminated at the data receiving terminal. At that time, the received-data quality discriminating section discriminates the accumulation quality of the received data based on sending-data quality information about the quality of data to be sent from the data sending terminal.

With this arrangement, it is possible to discriminate the received data quality simply and stably.

As still another preferable feature, the received-data quality discriminating section previously receives from the data sending terminal quality kind information about the kind of quality of data to be sent from the data sending terminal, and then determines a satisfactory accumulation quality based on said quality kind information. With this arrangement, it is possible to set a proper accumulation quality in the data receiving terminal all the time without any risk of determining the data sending quality unsupported by the data sending terminal as reference quality at the data receiving terminal.

As a further preferable feature, the data sending terminal further comprises an accumulation control section for deleting the sending data, which is accumulated in said sending-data accumulating section, from the sending data having lapsed a predetermined time.

With this arrangement, it is possible to accumulate alternative sending data in a minimum accumulation capacity without any risk of accumulating unnecessary sending data ever.

According to another generic feature, there is provided a data receiving terminal for receiving data from a data sending terminal, comprising:

(a) a received-data quality discriminating section for discriminating whether or not received data satisfies a predetermined quality; and (b) an alternative-data sending requesting section for, if the received data of a particular time section does not satisfy the predetermined quality as the result of discrimination by said received-data quality discriminating section, requesting a data sending terminal to send alternative data satisfying the predetermined quality for the data of the particular time section.

As a further preferable feature, there is provided a data sending terminal for sending data to a data receiving terminal, comprising:

(a) an alternative-data sending request receiving section for receiving a request for sending of alternative data satisfying a predetermined quality for data of a particular time section to be sent from the data receiving terminal if the received data of the particular time section does not satisfy as the result of discrimination at the data receiving terminal; and (b) an alternative-data sending section for, upon receipt of the sending request by the alternative-data sending request receiving section, sending alternative-data satisfying the predetermined quality to the data receiving terminal.

Thus, the present invention should by no means be limited to the case where the data receiving terminal receives for the purpose of accumulation, but the invention may be applied also to the case where the data receiving terminal receives for other purposes. Namely, if the received data of a particular time section does not satisfy a predetermined quality, the data receiving terminal can request the data sending terminal to send alternative data satisfying the predetermined quality for that time section and then can obtain the alternative data.

DESCRIPTION OF THE PREFERRED EMBODIMENTS

Preferred embodiments of the present invention will now be described with reference to the accompanying drawings.

(A) First Embodiment

Figure 1:
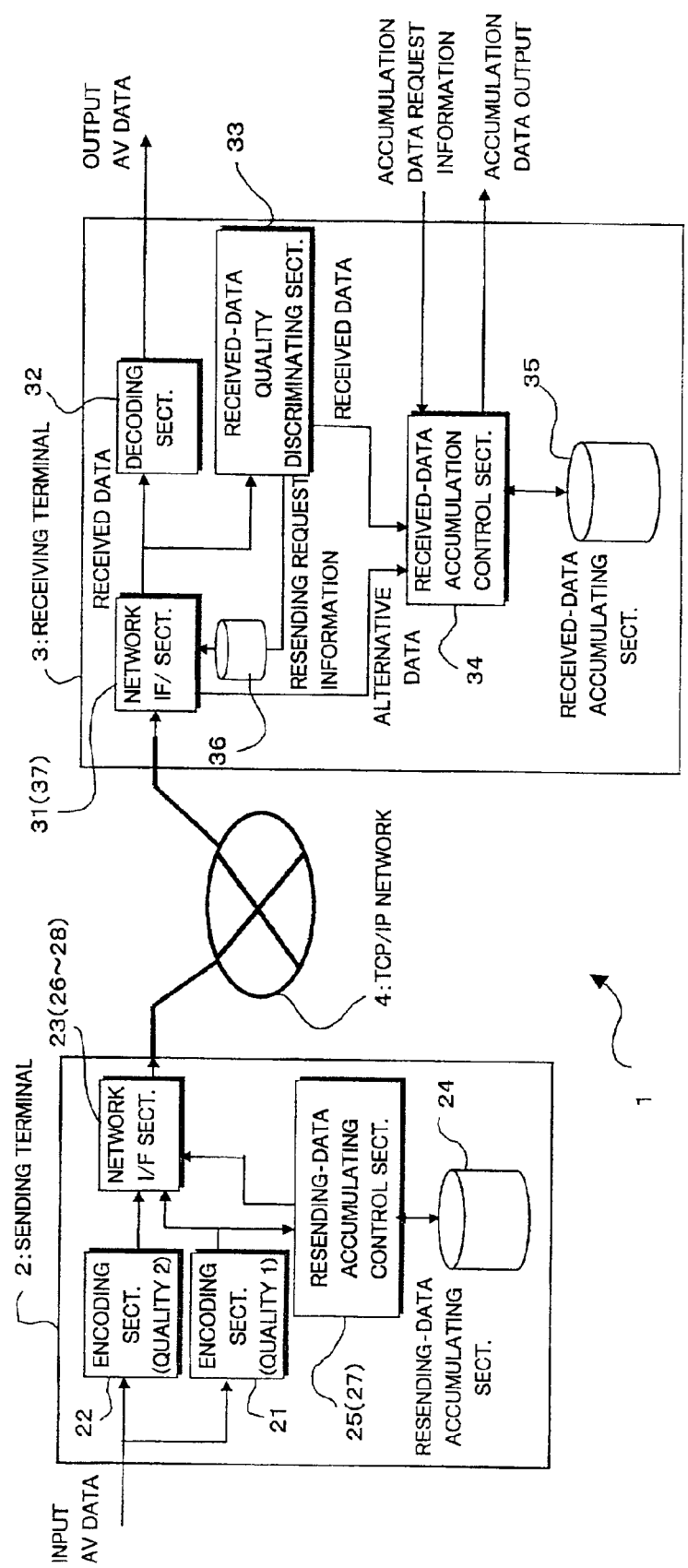
FIG. 1 is a block diagram showing a data communication system according to a first embodiment of the present invention.
Figure 10:
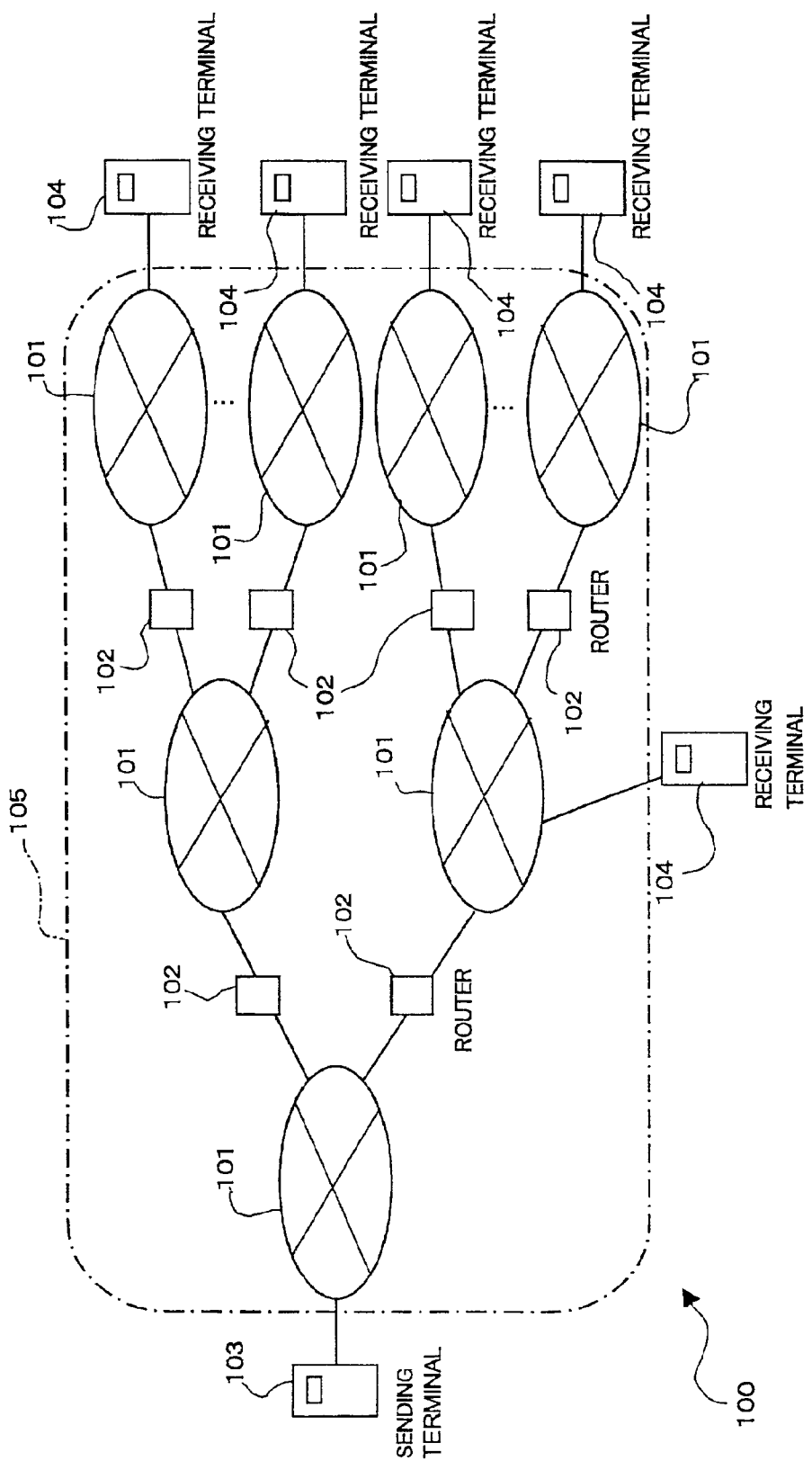
FIG. 10 is a diagram showing a data communication system using a TCP/IP network.
Figure 11:
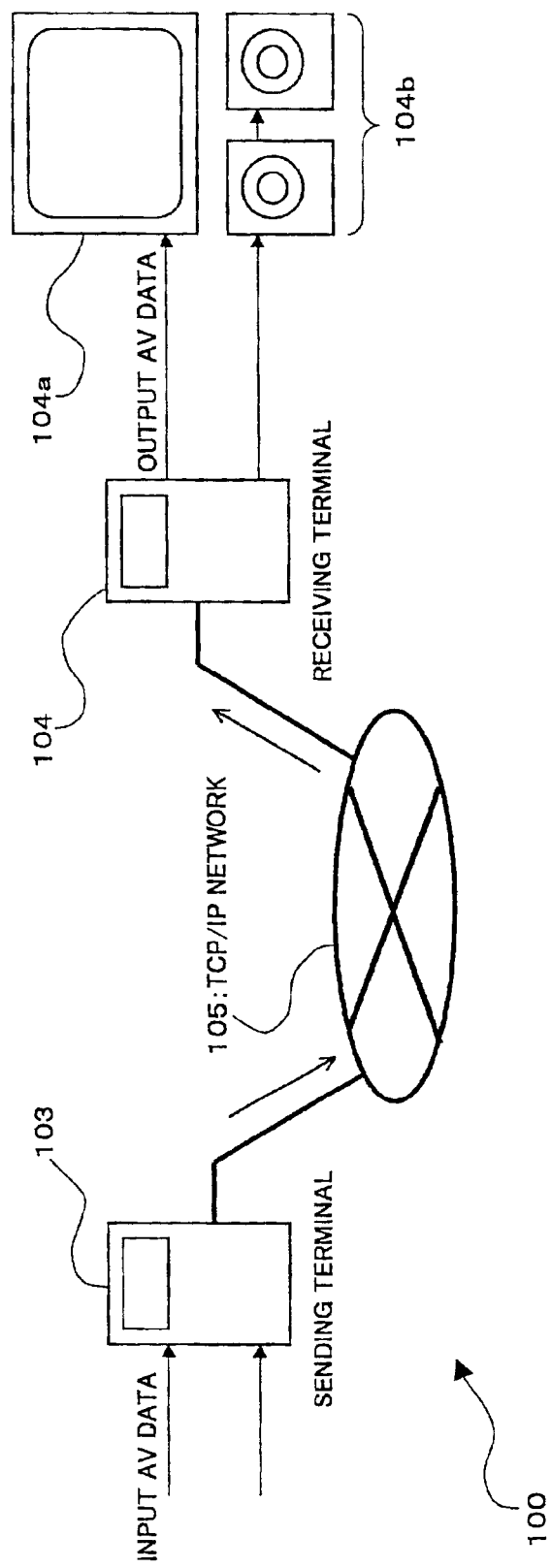
FIG. 11 is a diagram showing an AV data distribution system using a TCP/IP network.
Figure 12:
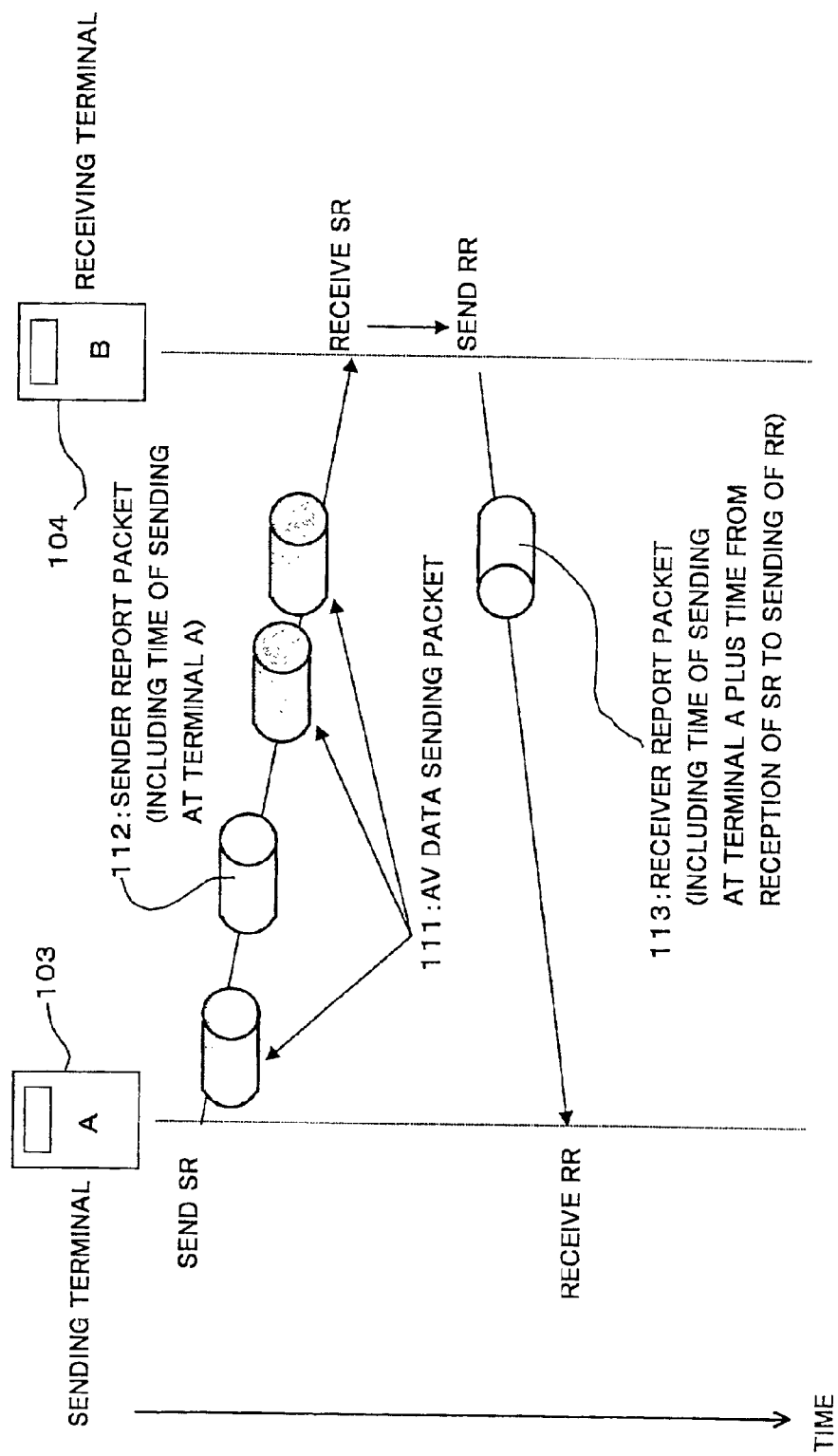
FIG. 12 is a diagram illustrating a method of measuring sending delay between the sending and receiving terminal using RTCP.
Figure 13:
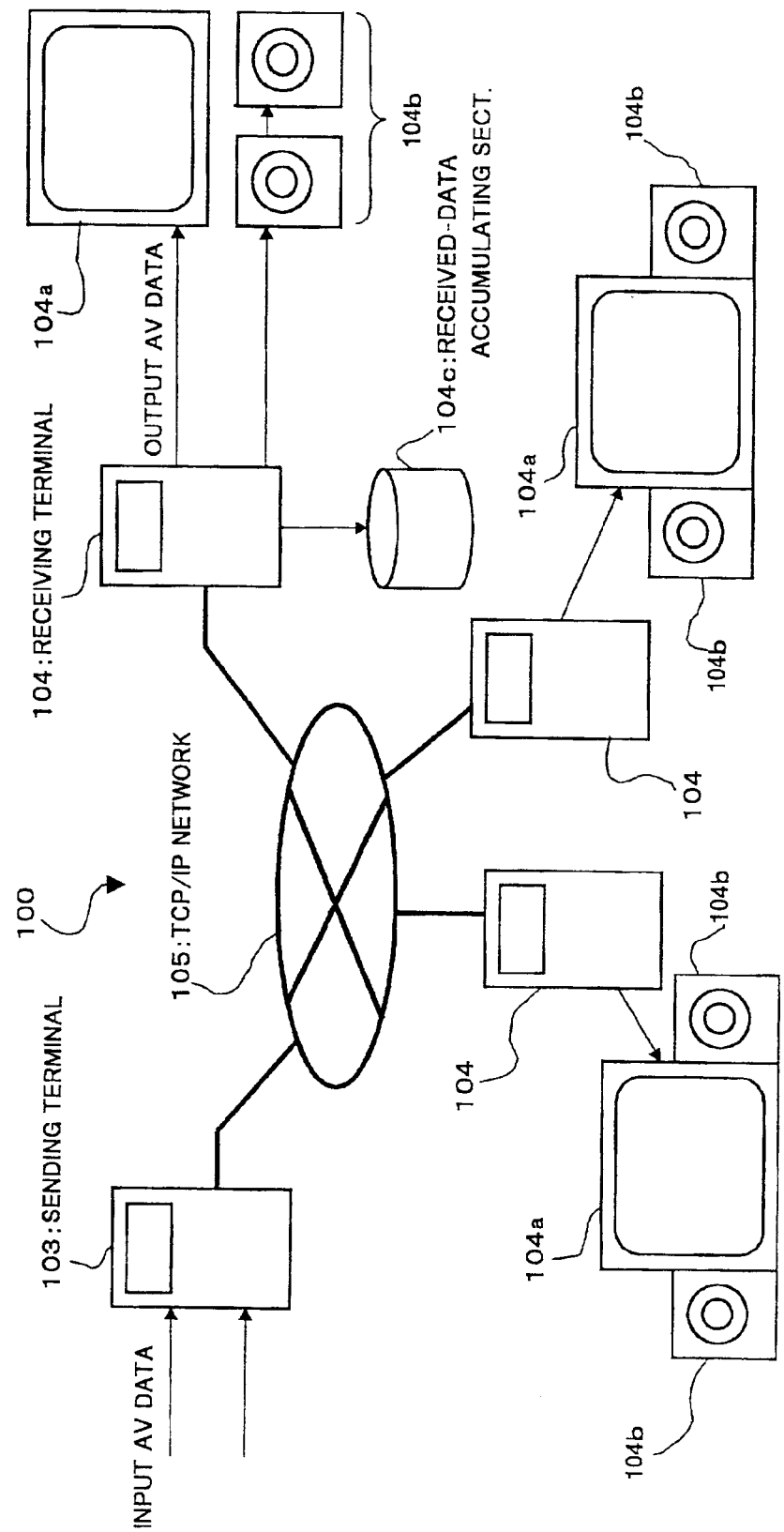
FIG. 13 is a diagram showing an AV data distribution system using a TCP/IP network which system includes terminals dedicated to only real-time reproduction and those dedicated to both real-time reproduction and accumulation in a mixed combination.

FIG. 1 is a block diagram showing a data communication system according to a first embodiment of the present invention. The data communication system 1 of FIG. 1 comprises data sending terminal (hereinafter also called the sending terminal) 2 and a data receiving terminal (hereinafter also called the receiving terminal) 3 communicably interconnected via a TCP/IP (transmission control protocol/internet protocol) network 4 identical with that described above in connection with FIG. 10.

In FIG. 1, the sending terminal 2 and the receiving terminal 3, only one each, are illustrated as connected to the TCP/IP network 4. Practically, however, a suitable number of each of the sending and receiving terminals 2, 3 are connected to the TCP/IP network 4 (hereinafter also called the network 4).

As a basic structure, shown in FIG. 1, the sending terminal 2 comprises first and second encoding sections 21, 22, a first network interface (I/F) section 23, a resending data accumulating section 24, and a resending data accumulation control section 25. On the other hand, the receiving terminal 3 comprises a second network interface (I/F) section 31, a decoding section 32, a received-data quality discriminating section 33, a received-data accumulation control section 34, a received-data accumulating section 35, and a resending-request information accumulating section 36.

In operation, at the sending terminal 2, the first encoding section 21 encodes AV data, which is input from a video camera or the like, at a predetermined encoding rate to obtain sending data of a predetermined quality "1". And the second encoding section 22 encodes the AV data at an encoding rate lower than the predetermined encoding rate in the first encoding section 21 to obtain sending data of a quality "2" lower than the quality "1". Accordingly the sending terminal 2 can send the input AV data with two kinds of qualities, quality "1" and quality "2".

The first network I/F section 23 has a function of converting sending data, which is obtained by any one of the encoding sections 21, 22, into IP packets to selectively send the IP packets to the TCP/IP network 4. In the first embodiment, the first network I/F section 23 sends the sending data of quality "1", which is obtained by the encoding section 21, during normal operation, for example, or the sending data of quality "2", which is obtained by the encoding section 22, if the load of the TCP/IP network 4 (traffic of the network band to the receiving terminal 3) is high.

Namely, the first network I/F section 23 can send the same AV data in either of two different qualities, i.e., quality "1" or quality "2". For example, when the network band to the receiving terminal 3 is narrowed as the load of the TCP/IP network 4 increases, the first network I/F section 23 can send AV data in quality "2" instead of quality "1" in which the same AV data was initially intended to be sent.

For this purpose, the first network I/F section 23 and the second network I/F section 31, which is at the receiving terminal 3, are equipped with a sending delay measuring function (a sending-report packet generating and sending function) between the sending terminal 2 and the receiving terminal 3, using the above-mentioned RTCP, for example. By this function, the sending terminal 2 recognizes a status of load (traffic) of the TCP/IP network 4 (expansion/shrinkage) of the network band to the receiving terminal 3) and hence can make a quality selection for the sending data based on the result of recognition.

In the meantime, the resending data accumulating section (sending data accumulating section) 24 accumulates the sending data of quality "1", which is obtained by encoding with the encoding section 21, in parallel to sending to the TCP/IP network 4. The resending data accumulating section 24 is in the form of HDD or a recording medium, such as RAM or MO (magneto-optical disc).

Further, the resending data accumulation control section 25 controls accumulation/takeout of data with respect to the resending data accumulating section 24. In the first embodiment, as described later, when the first network I/F section 23 receives a request for resending the sending data of a particular time section (request for resending alternative data satisfying accumulation quality described below) to be sent from receiving terminal 3 if the received data is judged as not satisfying a predetermined quality (accumulation quality) at the receiving terminal 3, the resending data accumulation control section 25 obtains the sending data from accumulated contents of the resending data accumulating section 24 to forward to the first network I/F section 23.

Namely, the resending data accumulating section 24 accumulates sending data to the receiving terminal 3 as alternative data, which is sendable to the receiving terminal 3 in accordance with the resending request from the receiving terminal 3. And the first network I/F section 23 serves as an alternative-data-sending-request receiving section 26 to receive the resending request from the receiving terminal 3. Being cooperative with the resending data accumulation control section 25, the first network I/F section 23 serves also as an alternative-data sending section 27 that, upon receipt of the resending request, obtains alternative data satisfying the accumulation quality from accumulation contents of the resending data accumulating section 24.

In the first embodiment, if a sending delay amount between the sending terminal 2 and the receiving terminal 3 exceeds a predetermined value, this sending of alternative data will not be carried out until the sending delay amount becomes equal to or less than the predetermined value.

On the other hand, at the receiving terminal 3, the second network I/F section 31 receives data (AV data) sent from the sending terminal 3 via the TCP/IP network 4 as IP packets. And the decoding section 32 decodes the AV data, which is received by the second network I/F section 31, in a decoding way in accordance with the encoding method of the sending terminal 2, thereby reproducing the encoded AV data.

Further, a received-data quality discriminating section 33 discriminates (judges) whether or not the AV data received by the second network I/F section 31 satisfies a predetermined accumulation quality. At that time, the received-data quality discriminating section 33 consults with information (sending data quality information) attached to the AV data, which is sent from the first network I/F section 23 of the sending terminal 2, and indicating data sending quality being currently sent, and recognizes received-data quality based on the information.

Given that information representing the quality (quality "1" or "2") is attached to the AV data being sent, the first network I/F section 23 of the sending terminal 2 serves as a sending-data-quality-information sending section 28 to send sending-data-quality information, based on which the received-data accumulation quality is to be discriminated at the receiving terminal 3, to the receiving terminal 3.

In the first embodiment, the accumulation quality at the receiving terminal 3 is set (determined) by selecting a suitable quality from data-quality-variation range information at the sending terminal 2 (quality kind information the sending terminal 2 is able to send; quality "1", quality "2") which information is sent from the sending terminal 2 before the start of communication. In the following description, as an illustrative example, the quality "1" is set as an accumulation quality at the receiving terminal 3.

And, for example, if the received data is judged as not satisfying a predetermined accumulation quality (quality "1") (namely, if the received-data quality is quality "2"), the received-data quality discriminating section 33 generates resending request information, which includes time-section information judged as less than accumulation quality, to the second network I/F section 31.

A resending-request-information accumulating section 36 temporarily accumulates the resending request information, and based on this resending request information, the second network I/F section 31 generates a resending request packet to the sending terminal 2 to request the sending terminal 2 to send alternative data (data of quality "1") satisfying accumulation quality for the data of the time section judged as less than the accumulation quality and sends the resending request packet to the TCP/IP network 4.

Namely, if the received-data quality discriminating section 33 has judged the received data as not satisfying the accumulation quality, the second network I/F section 31 at the receiving terminal 3 serves as the alternative-data sending requesting section 37 to request the sending terminal 2 to send alternative data satisfying the accumulation quality for the data of the time section. At that time, if the sending delay amount exceeds a predetermined value, this sending request will not be made until the sending delay amount becomes equal to or less than the predetermined value.

Further, a received-data accumulating section 35 accumulates received data of the time section, which is judged as satisfying the accumulation quality by the received-data quality discriminating section 33, and alternative data to be sent from the sending terminal 2 in response to the sending request sent from the second network I/F section 31, which serves as the alternative-data sending requesting section 37, (for the time section judged as less than accumulation quality). Each of the received-data accumulating section 35 and the resending-request-information accumulating section 36 is in the form of HDD or a recording medium, such as RAM or MO (magneto-optical disc).

The received-data accumulation control section 34 controls accumulation/takeout of data with respect to the received-data accumulating section 35, thereby causing the received-data accumulating section 35 to accumulate both received data (data of quality "1") judged as satisfying accumulation quality by the received-data-quality discriminating section 33 and alternative data (data of quality "1") to be sent from the sending terminal 2 in response to the request by the alternative-data sending requesting section 37 (the second network I/F section 31).

The received-data accumulation control section 34 serves also to take out accumulated data in accordance with accumulated-data request information, which is input from external equipment for subsequent use of AV data accumulated in the received-data accumulating section 35, and to output such corresponding accumulated data to the request source.

Figure 2:
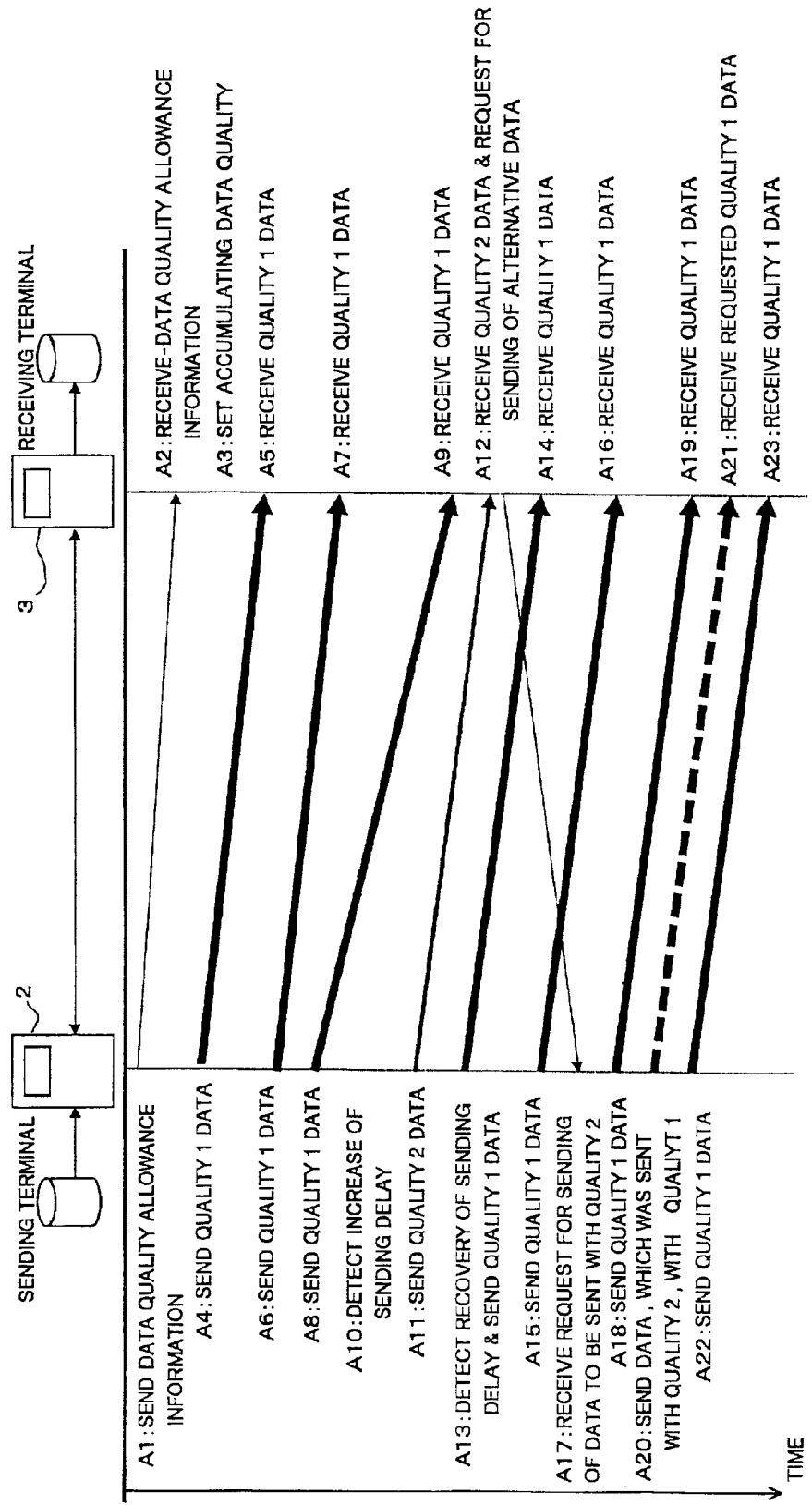
FIG. 2 is a sequence diagram illustrating the manner in which sending and receiving terminals of the data communication system of the first embodiment operate.

The operation of the data communication system 1 (the sending terminal 2 and the receiving terminal 3) of the first embodiment will now be described in detail with reference to FIG. 2.

First of all, prior to sending AV data, the sending terminal 2 sends information about the range in which the sending data varies in quality (information indicating which is the quality of the sending data between quality "1" or quality "2") in the form of an IP packet to the receiving terminal 3 by the first network I/F section 23, which serves as the sending-data-quality-information sending section 28 (step A1).

Upon receipt of this packet (step A2), the receiving terminal 3 determines the accumulation quality of the received data within the data-quality-variation range notified by the packet (assuming that it determines the accumulation quality as quality "1": step A3). Then the sending terminal 2 starts sending AV data in quality "1" (at that time, it sends also the sending-data quality information indicating that the AV data is being sent in quality "1": steps A4, A6, A8).

When the second network I/F section 31 has received the AV data sent from the sending terminal 2 (steps A5, A7, A9), the receiving terminal 3 outputs the received data to both the decoding section 32 and the received-data quality discriminating section 33. The decoding section 32 decodes the received data, which has been input from the second network I/F section 31, into video signals and voice signals to output these signals to a display unit and a speaker.

In the meantime, the received-data quality discriminating section 33 discriminates whether or not the received data satisfies the accumulating quality (quality "1") set in the receiving terminal 3; if the result of discrimination is positive, the received-data quality discriminating section 33 outputs the received data to the received-data accumulation control section 34 to cause the received-data accumulating section 35 to accumulate. Thus, at the receiving terminal 3, real-time reproduction and accumulation of AV data are performed concurrently (in parallel).

Subsequently at a particular time point, the sending terminal 2 (the first network I/F section 23) detects an increase of sending delay between the sending terminal 2 and the receiving terminal 3 (step A10), and hence changes the quality of the sending data from quality "1" to "2" to correct the delay. Then the sending terminal 2 starts sending the AV data in quality "2" by the action of the first network I/F section 23 (step A11).

After that, upon detection that the sending delay with the receiving terminal 3 has been corrected, the sending terminal 2 changes the sending-data quality back to the initial quality "1" and restarts sending the AV data in quality "1" (steps A13, A15, A18, A22).

In the meantime, when the received-data quality discriminating section 33 detects, upon receipt of the AV data in quality "2" sent from the sending terminal 2 in step A11, that the quality of the AV data being received has been downgraded below a predetermined accumulation quality "1" (the AV data of quality "2" has been received), the receiving terminal 3 inputs resending request information (including information about the time section where the data not satisfying the accumulation quality) to the second network I/F section 31.

The second network I/F section 31 generates a resending-request packet based on the input resending request information and sends the generated packet to the sending terminal 2, thereby making a request (request for sending alternative data) to the sending terminal 2 for resending the AV data of the time section, which has been sent in quality "2" in step A11, then in quality "1" (step A12).

At that time, however, if the sending delay amount between the sending terminal 2 and the receiving terminal 3 exceeds a predetermined value, the second network I/F section 31 will not make this request until the sending delay amount becomes equal to or less than the predetermined value. Then the receiving terminal 3 continues receiving (real-time reproducing) and accumulating AV data of quality "1" sent from the sending terminal 2 in steps A13, A15, A18, A22 (steps A14, A16, A19, A23).

In the meantime, upon receipt of a sending request (packet) from the receiving terminal 3 during sending AV data in quality "1" (step A17), the sending terminal 2 sends AV data of the requested time section in quality "1" again (step A20) Namely, the sending terminal 2 takes out AV data of quality "1", which is encoded by the encoding section 21, for the data of the time section requested from the receiving terminal 3 by the resending-data accumulation control section 25 as alternative data of AV data sent in quality "2", and sends the alternative data to the receiving terminal 3 via the first network I/F section 23.

At that time, however, if the sending delay amount between the sending terminal 2 and the receiving terminal 3 exceeds a predetermined value, the first network I/F section 23 will not send the alternative data until the sending delay amount becomes equal to or less than the predetermined value.

And at the receiving terminal 3, upon receipt of the AV data resent in quality "1" (step A21), the AV data is accumulated in the received-data accumulating section 35 under the control of the received-data accumulation control section 34.

Thus the receiving terminal 3 is able to accumulate AV data of quality "1", which is initially intended for the whole time section, in the received-data accumulating section 35 during real-time reproduction of AV data of the quality as controlled in accordance with the network status at the sending terminal 2 (sending delay amount between the sending terminal 2 and the receiving terminal 3). Accordingly it is possible to realize real-time reproduction and high-quality accumulation of received data at the same time.

Further, since sending of a sending request of alternative data from the receiving terminal 3 to the sending terminal 2 and sending of the requested alternative data from the sending terminal 2 to the receiving terminal 3 are either performed when the sending delay amount (network load) between the sending terminal 2 and the receiving terminal 3 is equal to or less than a predetermined value, it is possible to prevent the network load from inadvertently increasing, thus restricting any influence on real-time reproduction at the receiving terminal 3 due to the request for alternative data and the sending of the alternative data, to a minimum.

Further, since the accumulation quality at the receiving terminal 3 is determined within the quality variation range previously notified by the sending terminal 2, an appropriate quality is set at the receiving terminal 3 all the time without determining any sending quality, which is not supported at the sending terminal 2, as a reference quality at the receiving terminal 3.

In the foregoing example, information about a current data sending quality is sent from the sending terminal 2 to the receiving terminal 3 to monitor the quality (to detect any occurrence of lowering of the quality) at the receiving terminal 3. Alternatively, at the receiving terminal 3, the amount of received data of a particular time section may be monitored to detect any occurrence of lowering of the quality.

Figure 3:
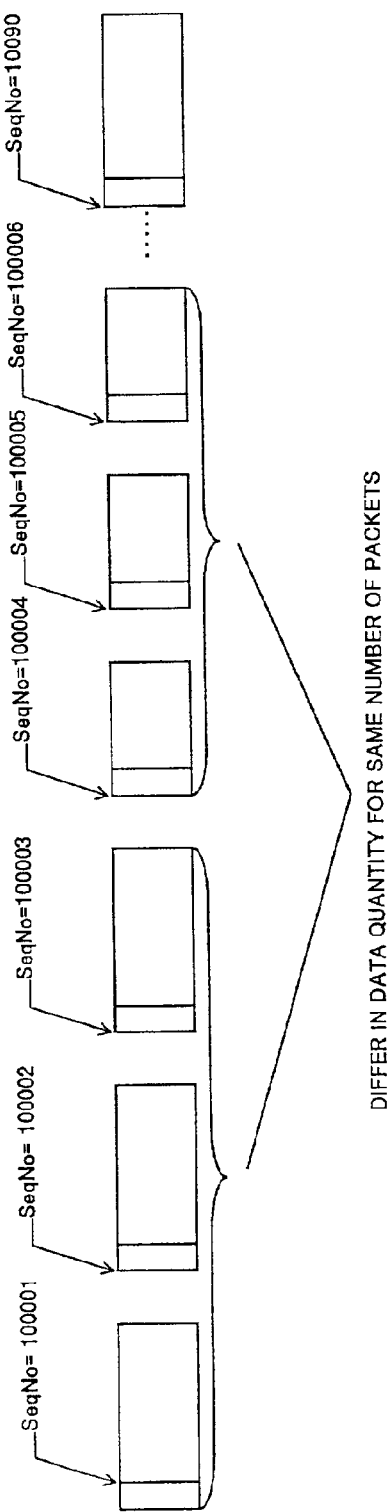
FIGS. 3 and 4 are diagrams each illustrating a method of detecting a change of quality of received data according to the first embodiment.

Namely, at the sending terminal 2, if data is stored and sent in such a manner that 1 frame of AV data corresponds to 1 packet of UDP (user datagram protocol), a sequence number is added to each sending packet as shown in FIG. 3. And at the receiving terminal 3 (the received-data quality discriminating section 33), if the amount of received data for the same number of received packets is reduced, the quality of received data is judged as having lowered. At that time, the above-mentioned sequence number is added to an UDP header (RTP header when, for example, sending data using RTP on UDP) at a trailing end thereof.

Figure 4:
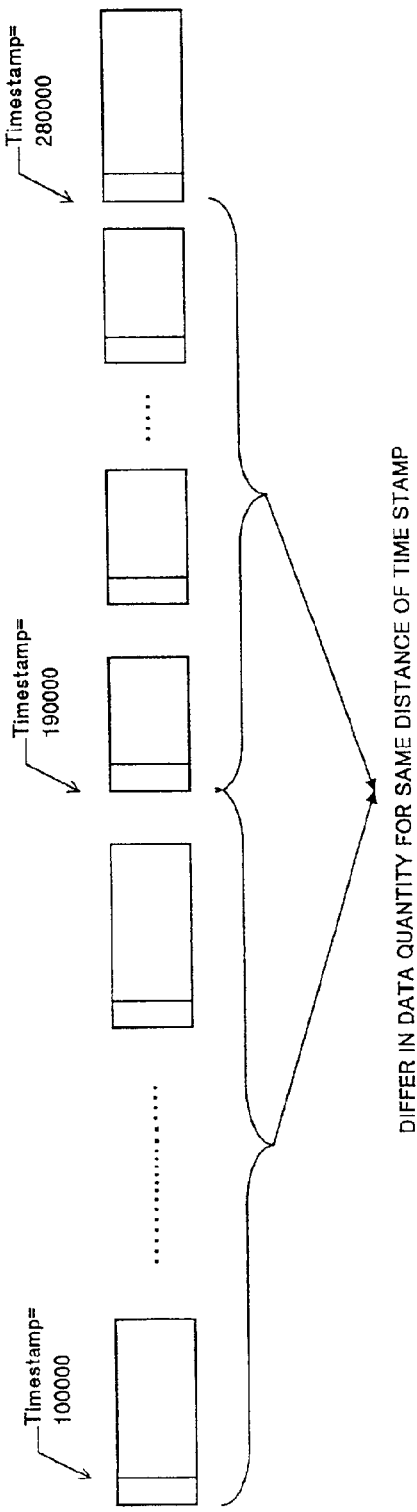

As another alternative, as shown in FIG. 4, at the sending terminal 2, AV data may be sent with a time stamp representing a time to reproduce the data stored at the sending terminal 2 and added to the trailing end of the UDP packet (for sending an MPEG system stream in RTP, a time stamp with a precision of 90 kHz may be added to an RTP header). And at the receiving terminal 3 (the received-data quality discriminating section 33), the time to reproduce may be detected by monitoring the amount of data of a constant period, thus finding any change of received-data quality.

In the meantime, at the sending terminal 2, if the resending-data accumulating section 24 previously has a capacity such as to accumulate all the sending data to the receiving terminal 3, it is possible to respond all the time to any alternative-data sending request from the receiving terminal 3. However, since there is a limit in the accumulation capacity of the resending-data accumulating section 24, the resending-data accumulation control section 25 receives a sending request, which is contained in accumulated sending data, from the receiving terminal 3 and discards all data except the data for which a sending process has not yet been completed in response to that request.

Specifically, the resending-data accumulation control section 25 subsequently discards in priority the data for which less sending requests will presumably be received from the receiving terminal 3 and which is less necessary to be sent though a sending request is received.

For example, among data of the time section for which no sending request is received from the receiving terminal 3, data a constant time lapsed after being sent is low in possibility of receiving a sending request from the receiving terminal 3; therefore it is presumably no problem to discard such data. Further, if inter-frame estimation encoding is performed on image data, it can be considered that the data of the frame not referred by another frame during decoding is regarded as less significant and is hence increased in priority to be discarded. And for voice data, it is considered that the data of the time section noted as void of sound is discarded and is hence canceled though a sending request is received from the receiving terminal 3.

Figure 5:
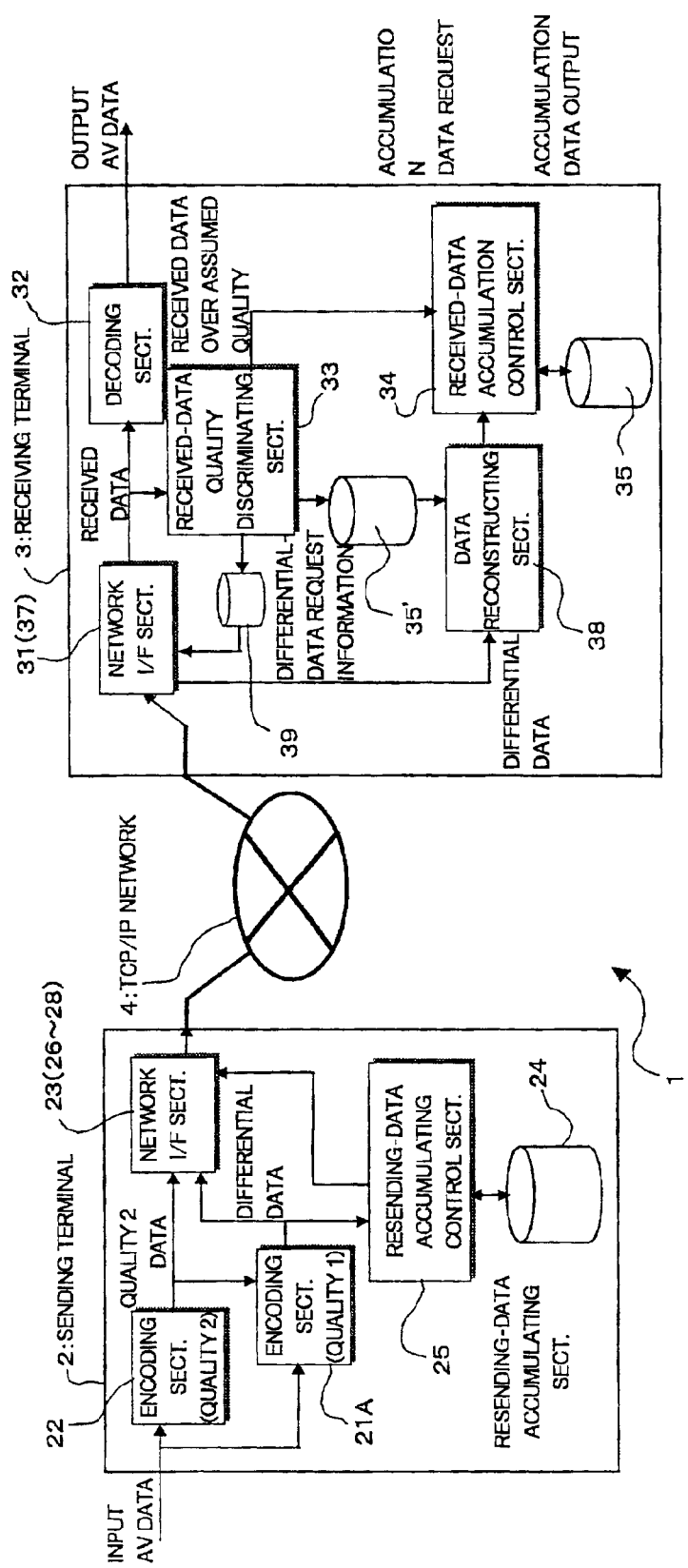
FIG. 5 is a block diagram showing a modification of the data communication system of the first embodiment.

(A') Modification of the First Embodiment:

FIG. 5 is a block diagram showing a data communication system according to a modification of the first embodiment. The data communication system 1 of FIG. 5 is identical in construction with that of FIG. 1 except that the sending terminal 2 is equipped with an encoder 21A as a substitution for the encoding section 21 and the receiving terminal 3 is equipped with a less-than-estimated-quality received-data accumulating section 35', a data reconstructing section 38, and a differential-data-request information accumulating section 39.

In operation, at the sending terminal 2, the encoding section 21A encodes differential data between input AV data and AV data of quality "2" obtained by the encoding section 22. The resultant differential data is combined (multiplied) with the AV data of quality "2", which is obtained by the encoding section 22, by the first network I/F section 23, thereby obtaining AV data of quality "1". Thus in the sending terminal 2 of this modification, a hierarchical encoding method is used to encode the input AV data.

Therefore, also if it is necessary to send AV data of quality "1" in accordance with a request from the receiving terminal 3, the sending terminal 2 can cope with the need by accumulating only the differential data (output of the encoding section 21A). For this purpose, the resending-data accumulation control section 25 of this modification performs a control such that only the differential data is accumulated in the resending-data accumulating section 24.

In the meantime, if the received-data quality is less than a predetermined accumulation quality in the received-data quality discriminating section 33, the receiving terminal 3 makes a request to resend only the differential data for AV data of the time section as alternative data likewise the first embodiment. Namely, at that time, the received-data quality discriminating section 33 generates a request for an alternative data (differential-data request information) of the differential data of the time section.

This differential-data request information is temporarily accumulated in the differential-data-request information accumulating section 39, and the second network I/F section 31 generates a differential-data-sending-request packet to the sending terminal 2 which packet requests for sending the differential data, based on the differential-data-request information.

Upon receipt of the differential data from the sending terminal 2 in response to this differential-data-sending request (packet), the receiving terminal 3 combines (multiplies) the differential data with received less-than-accumulation-quality AV data, which is accumulated in the less-than-estimated-quality received-data accumulating section 35' (in the form of HDD or a recording medium such as RAM or MO), by the data reconstructing section 38, obtaining AV data of quality "1". This AV data of quality "1" is accumulated in the received-data accumulating section 35 together with the AV data of the time section that has been judged by the received-data quality discriminating section 33 as being equal to or more than the accumulation quality.

This modification is identical in construction and operation with the first embodiment, except that information to be transferred between the sending terminal 2 and the receiving terminal 3 is related with the differential data.

According to the modification, it is possible to achieve the same results as those with the first embodiment, to reduce the necessary accumulation capacity of the resending-data accumulating section 24 at the sending terminal 2, and to minimize the amount of alternative data to be sent to the TCP/IP network 4 (i.e., the amount of traffic of the TCP/IP network 4), thus retarding a further increase of network load.

Figure 6:
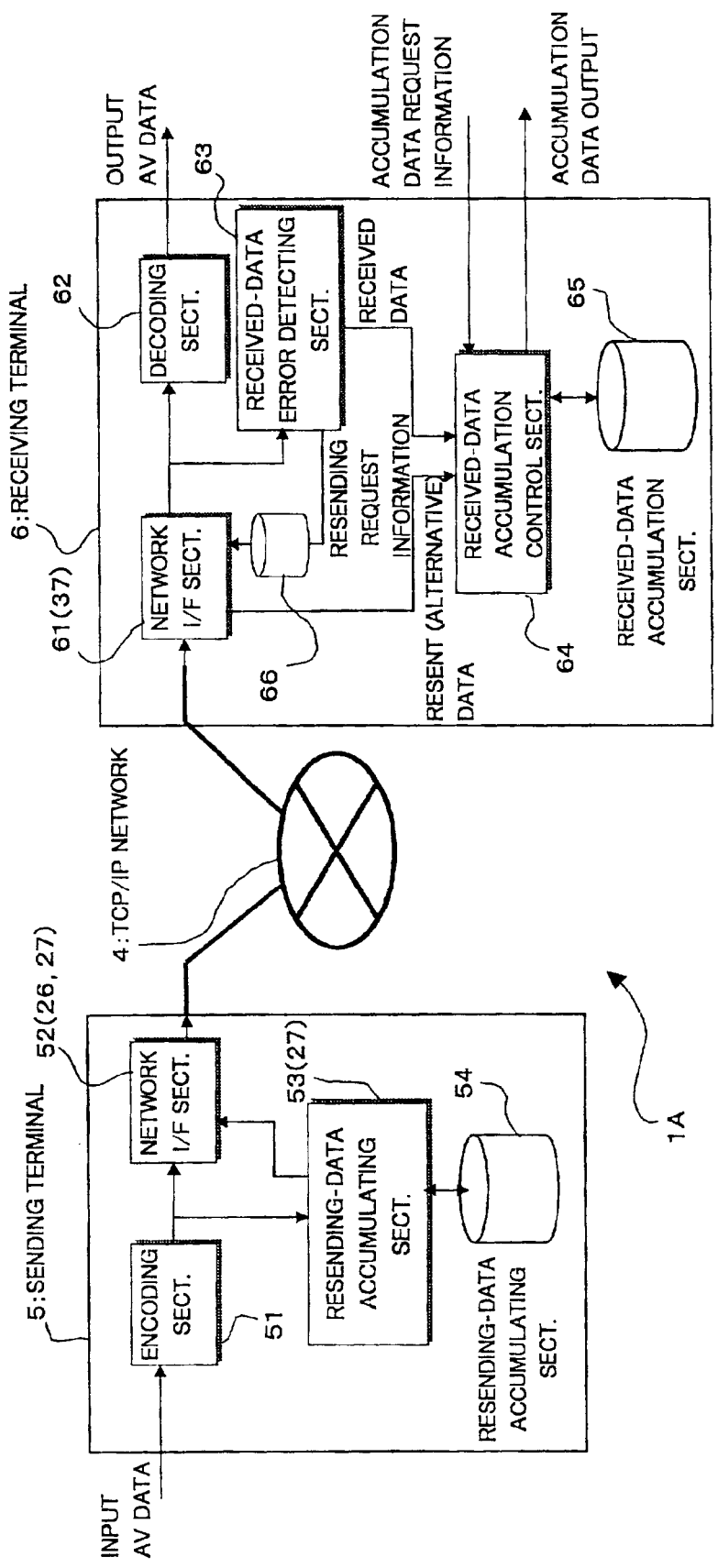
FIG. 6 is a block diagram similar to FIG. 5, but showing another data communication system according to a second embodiment of the present invention.

(B) Second Embodiment:

FIG. 6 is a block diagram showing another data communication system according to a second embodiment of the present invention. The data communication system 1A of FIG. 6 includes a sending terminal (data sending terminal) 5 and a receiving terminal (data receiving terminal) 6 which are mutually communicably interconnected via the same TCP/IP network 4 as described in connection with FIG. 10. Though illustration is omitted in FIG. 6, actually a suitable number of sending terminals 5 and a suitable number of receiving terminals 6 are connected to the TCP/IP network 4.

As shown in FIG. 6, the individual sending terminal 5 of the second embodiment is equipped with an encoding section 51, a network I/F section 52, a resending-data accumulation control section 53, and a resending-data accumulating section 54. And the individual receiving terminal 6 is equipped with a network I/F section 61, a decoding section 62, a received-data error detecting section 63, a received-data accumulation control section 64, a received-data accumulating section 65, and a resending-request-information accumulating section 66.

In operation, at the sending terminal 5, the encoding section 51 encodes input AV data by a predetermined encoding method, and the network I/F section 52 sends the encoded AV data in packets to the TCP/IP network 4 and receives a resending-request packet sent from the receiving terminal 6 as described later.

Further, the resending-data accumulation control section 53 performs a control such as to accumulate the encoded AV data in the resending-data accumulating section 54 as alternative data, which is able to be requested for resending from the receiving terminal 6, during sending from the network I/F section 52. And upon receipt of the resending-request packet by the network I/F section 52, the resending-data accumulation control section 53 takes out from the resending-data accumulating section 54 data of the time section requested by that packet and hands the takeout data to the network I/F section 52.

Specifically, in the second embodiment, like the first embodiment, the network I/F section 52 serves as an alternative-data-sending-request receiving section 26 to receive the resending request from the receiving terminal 6. In cooperation with the resending-data accumulation control section 53, the network I/F section 52 serves also as an alternative-data sending section 27 to obtain alternative data, which satisfies the above-mentioned accumulation quality, from accumulated contents of the resending-data accumulating section 54 (in the form of HDD or a recording medium such as RAM or MO) and to send the obtained alternative data to the receiving terminal 6.

In the meantime, at the receiving terminal 6, the network I/F section 61 receives data (AV data including an SR packet) sent from the sending terminal 5 via the TCP/IP network 4 as IP packets. And the decoding section 62 decodes the AV data, which is received by the network I/F section 61, by a decoding method in accordance with the encoding method at the sending terminal 5 (encoding section 51), thus reproducing the encoded AV data.

Further, the received-data error detecting section 63 discriminates whether or not an error appears in the received data (encoded AV data) from the network I/F section 61, thereby monitoring the quality of the received data. Upon detection of an error, the received-data error detecting section 63 judges the received AV data as not satisfying a predetermined accumulation quality for the error-appearing time section and outputs resending-request information, which requests for resending AV data (alternative data) of the error-appearing time section, to the network I/F section 61 likewise in the first embodiment.

Also in this case, the network I/F section 61 generates a resending-request packet, which is addressed to the sending terminal 5, for the AV data of the error-appearing time section to send the resending-request packet to the TCP/IP network 4. Namely, also in the second embodiment, if the received-data error detecting section 63 has judged as not satisfying the accumulation quality, the network I/F section 61 serves as the alternative-data sending requesting section 37 to request the sending terminal 5 for alternative data satisfying the data of the error-appearing time section.

In the description, "an error of received data" to be detected by the received-data error detecting section 63 means an error of an upper level (related with packet contents) as to whether or not continuity of AV data sent in packet is lost; a received-data error at a packet-sending-protocol level, such as UDP to be controlled in existing resending is detected/removed by the network I/F section 61.

For this purpose, the network I/F section 61 of the second embodiment has a function of measuring all the time a packet error quantity per unit time in a packet-sending-protocol level. In this embodiment, meeting the condition that the thus measured error quantity does not exceeds a predetermined value, resending-request information is read out from the resending-request information accumulating section 66 by the network I/F section 61 to generate and send a resending-request packet.

Further, the received-data accumulation control section 64 makes a control such as to accumulate the AV data (satisfying accumulation quality), in which no error has been detected by the received-data error detecting section 63, in the received-data accumulating section 65 (in the form of HDD or a recording medium such as RAM or MO) as it is. For the AV data (less than accumulation quality) in which an error has been detected by the received-data error detecting section 63, the received-data accumulation control section 64 then accumulates alternative data, which is sent from the sending terminal 2 in response to the resending-request packet, in the received-data accumulating section 65.

Also in the second embodiment, the received-data accumulation control section 64 takes out the corresponding accumulated data to output it to the request source, in accordance with accumulated-data-request information input from an external unit for secondary use of AV data accumulated in the received-data accumulating section 65.

Figure 7:
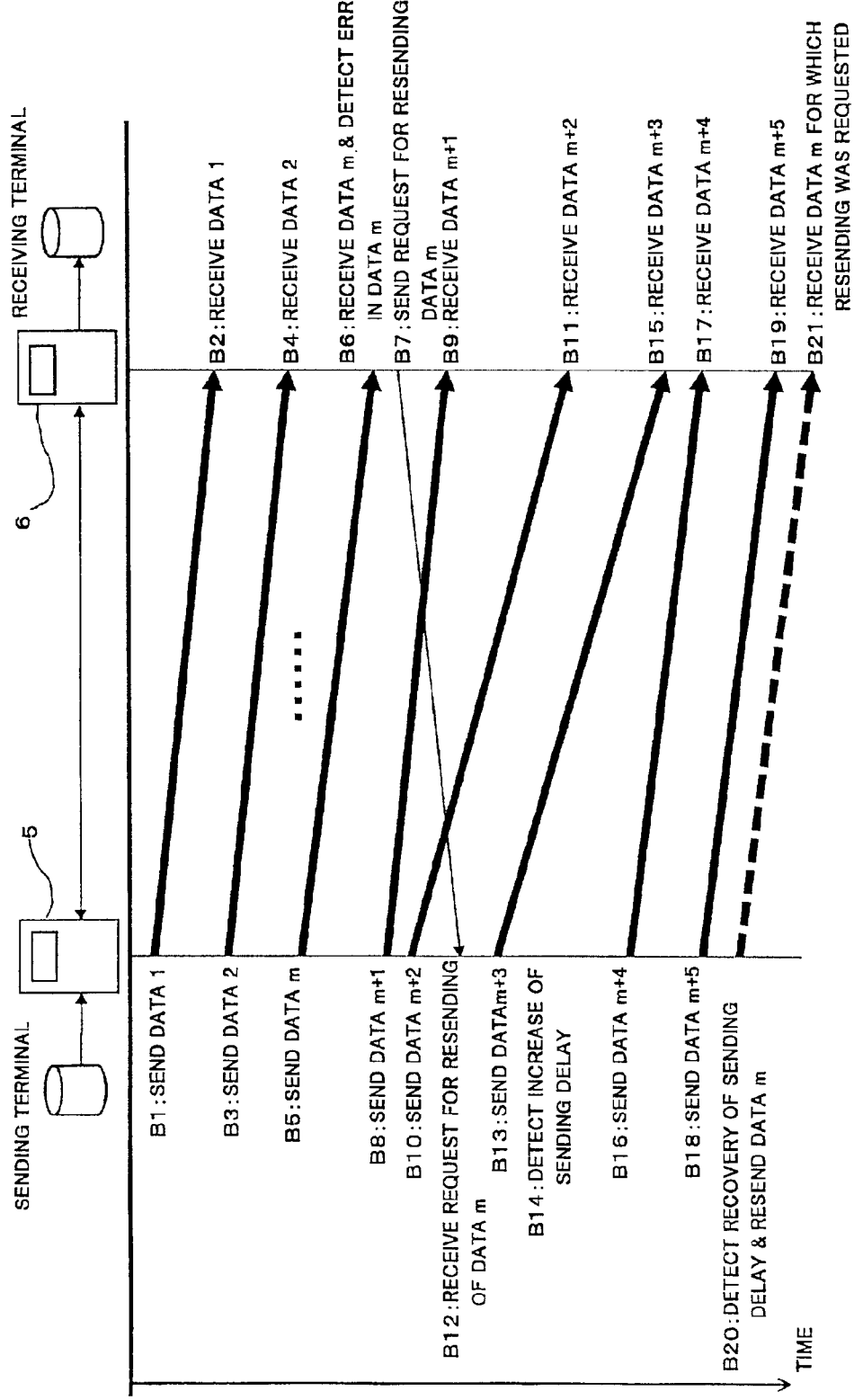
FIG. 7 is a sequence diagram illustrating the manner in which sending and receiving terminals of the data communication system of the second embodiment operate.

The operation of the data communication system (the sending terminal 5 and the receiving terminal 6) of the second embodiment will now be described in detail with reference to FIG. 7.

First of all, at the sending terminal 5, the network I/F section 52 converts AV data 1 through m (m is a natural number), which is encoded into packets by the encoding section 51, and then successively sends the packets to the TCP/IP network 4 (steps B1, B3, B5).

At the receiving terminal 6, when the packets (AV data) sent from the sending terminal 5 has thus been received by the network I/F section 61 (steps B2, B4, B6), a packet disassembling process is performed, and the disassembled packets are outputted respectively to the decoding section 62 and the received-data error detecting section 63.

The decoding section 62 decodes the received data from the network I/F section 61 to reproduce AV data and output the AV data to a display unit and a speaker. And the received-data error detecting section 63 discriminates whether or not an error appears in the received data, outputs error-free data to the received-data accumulation control section 64 as it is, and accumulates the error-free data in the received-data accumulating section 65.

Assuming that the received-data error detecting section 63 has detected an error in the data m among the received data 1 through m (step B6'), the received-data error detecting section 63 generates necessary information (resending-request information such as time-section information) in order to send a resending request to the sending terminal 5 for the error-detected AV data m. This resending-request information is temporarily accumulated in the resending-request information accumulating section 66.

Upon accumulation of the resending-request information in the resending-request information accumulating section 66, the network I/F section 61 reads out the resending-request information from the resending-request information accumulating section 66 as the error quantity measured by the error quantity measuring function does not exceed a predetermined value. Then the network I/F section 61 generates a resending-request packet addressed to the sending terminal 5 based on the read-out resending-request information, and send the generated packet to the TCP/IP network 4 (step B7).

Also during that time, the sending terminal 5 continues sending the AV data m+1 through m+5 (steps B8, B10, B13, B16, B18), and the receiving terminal 6 successively receives the AV data m+1 through m+5 as it accumulates the received AV data in the received-data accumulating section 65 unless any error is detected by the received-data error detecting section 63 (steps B9, B11, B15, B17, B19).

Now if a resending request (packet) from the receiving terminal 6 is received after the sending terminal 5 has sent the AV data m+2 (step B12), the resending-data accumulation control section 53 of the sending terminal 5 makes a control such as to take out the data of the requested time section (alternative data: AV data m) from the received-data accumulating section 54 and to send the take-out data to the receiving terminal 6.

Otherwise if the sending terminal 5 (network I/F section 52) detects an increase of sending delay amount(exceeding a predetermined value) between the sending terminal 5 and the receiving terminal 6 (step B14) after having sent the AV data m+3 (step B13). The network I/F section 52 will not send the alternative data m at that time point until after it recovers, namely, the sending delay amount becomes equal to or less than a predetermined value (step B20).

Upon receipt of this AV data m (step B21), the receiving terminal 6 accumulates it, together with the error-free AV data 1 through m−1, m+1 through m+5, in the received-data accumulating section 65 by the received-data accumulation control section 64. As a result, the AV data of the entire time section sent from the sending terminal 5 is accumulated in an error-free manner in the received-data accumulating section 65 of the receiving terminal 6.

As is apparent from the foregoing, also in the second embodiment, since the receiving terminal 6 can accumulate the (error-free) AV data of the initially estimated quality for the entire time section being sent, with real-time reproduction of the AV data from the sending terminal 5, it is possible to realize real-time reproduction and high-quality accumulation of the received data.

Further, since sending an alternative-data sending request from the receiving terminal 6 to the sending terminal 5 is carried out under such a condition that the rate of occurrence of errors in the received data of a particular constant period of time is equal to or loss than a predetermined value, it is possible to surely make the sending request to the sending terminal 5. On the other hand, since sending alternative data from the sending terminal 5 to the receiving terminal 6 is carried out under such a condition that the sending delay amount between the sending terminal 5 and the receiving terminal 6 is equal to or less than a predetermined value, it is possible to minimize influence of the sending of alternative data on real-time reproduction at the receiving terminal 6.

(C) Another Modification of First Embodiment:

In the first embodiment, the quality of sending data to the receiving terminal 3 is converted either at the sending terminal 2 or at a terminal other than the sending terminal 2 (agent terminal).

Figure 8:
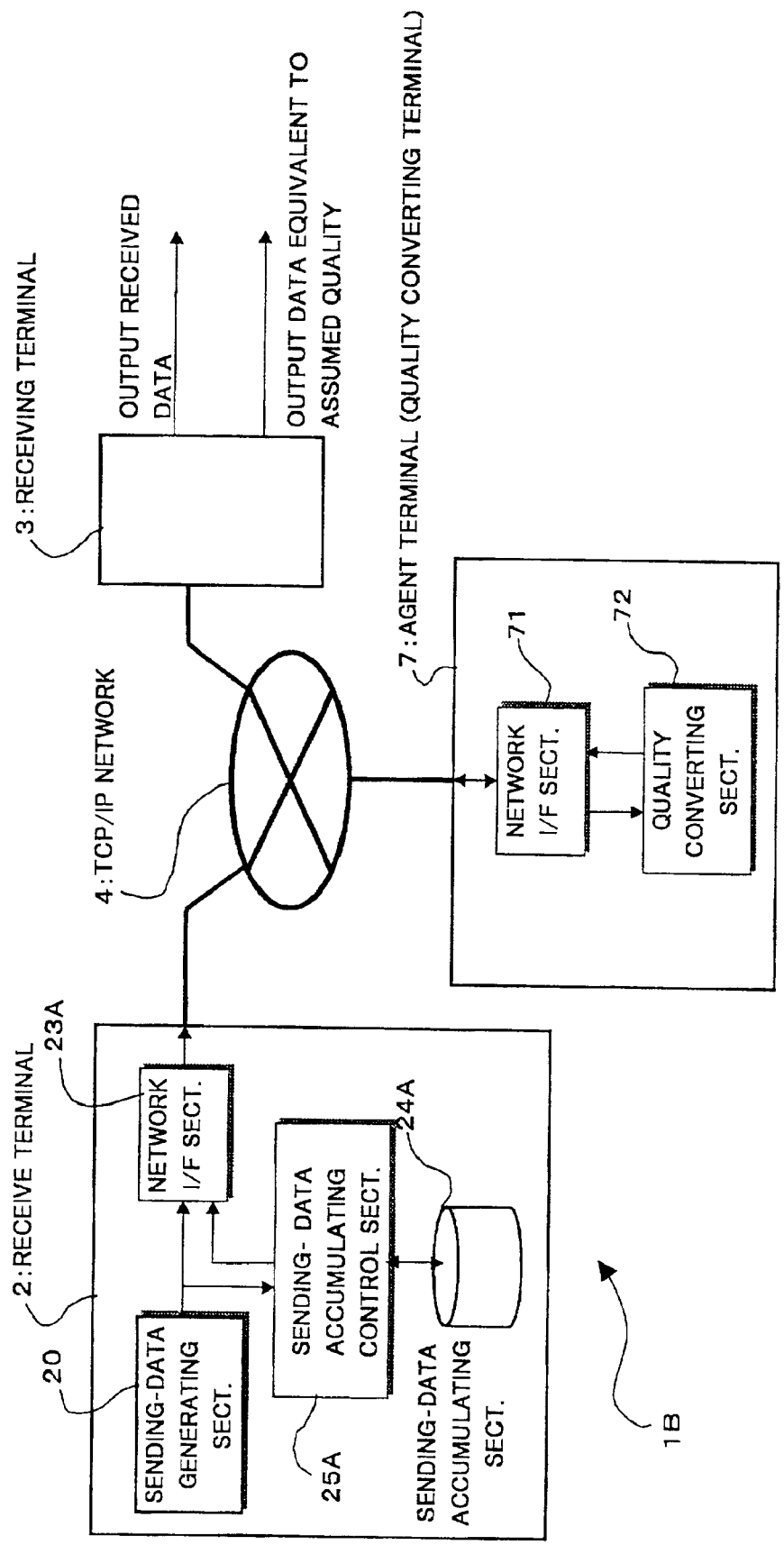
FIG. 8 is a block diagram showing another modification of the data communication system of the first embodiment.

For example, as shown in FIG. 8, an agent terminal (a quality-converting terminal) 7 is connected to the TCP/IP network 4; at this quality-converting terminal 7, the quality of sending data (such as AV data) generated at the sending terminal 2 is converted into a quality in accordance with the status of load of the TCP/IP network 4, whereupon the resulting data is sent to the receiving terminal 3. Also in this data communication system 1B of FIG. 8, actually a suitable number of sending terminals 2 and a suitable number of receiving terminal 3 are connected to the TCP/IP network 4.

In this case, at the sending terminal 2, sending data (such as AV data) generated by a sending-data generating section 20 is sent to the quality-converting terminal 7 via a first network I/F section 23A as it is, and a sending-data accumulation control section 25A performs a control such as to accumulates the sending data in a sending-data accumulating section 24A.

Then, when a second network I/F section 71 has received AV data from the sending terminal 2, the quality-converting terminal 7 transfers the received data to the receiving terminal 3. At that time, upon detection of an increase of sending delay amount (a heavy traffic of network band) as measured between the sending terminal 2 and the receiving terminal 3, a quality converting section 72 converts the received data into a quality downgraded from the original quality and sends the downgrade-quality data to the received terminal 3.

Having the same construction as that of FIG. 1, the receiving terminal 3 of this modification, like the first embodiment, discriminates the quality of AV data received from the quality-converting terminal 7, and accumulates the received data satisfying a predetermined accumulation quality as it is. And if the received data does not satisfy the predetermined accumulation quality, the receiving terminal 3 sends a request to the sending terminal 2 to send alternative data equal to or more than the accumulation quality, and accumulates the alternative data, which is sent from the sending terminal 2 in response to the request, together with other received data equal to or more than the accumulation quality.

A destination terminal to which an alternative-data-sending request is to be sent if the receiving terminal 3 has judged the quality of the received data as less than the predetermined accumulation quality may be the agent terminal 7 rather than the sending terminal 2. In this alternative case, it is necessary to previously transfer the sending data, which has accumulated in the sending-data accumulating section 24A of the sending terminal 2, to the agent terminal 7, or to successively accumulate the original AV data, which was received from the sending terminal 2 before conversion of accumulation quality, at the agent terminal 7.

Also in a system having the above-mentioned quality-converting terminal 7, like the modification of the first embodiment, alternative data to be sent may be only differential data by applying hierarchical encoding to a quality converting process.

Figure 9:
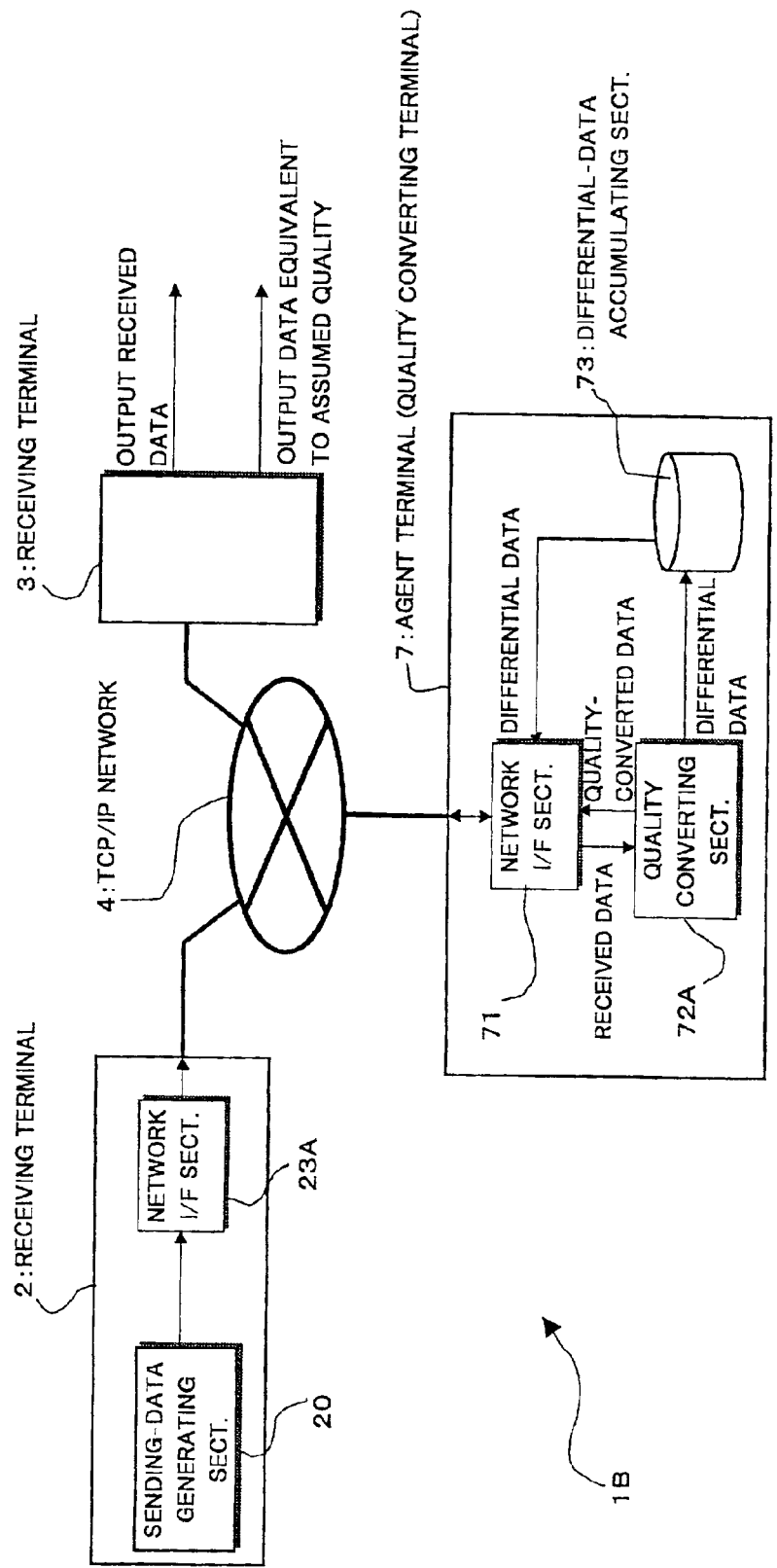
FIG. 9 is a block diagram similar to FIG. 8, but showing still another modification of the data communication system of the first embodiment.

For example, as shown in FIG. 9, at the quality-converting terminal 7, AV data from the sending terminal 2 is encoded in a quality converting section 72A by hierarchical encoding, and particular encoded data and differential data are combined to generate encoded data of a different accumulation quality. This encoded data is sent to the receiving terminal 3, while the differential data is accumulated in a differential-data accumulating section 73 as alternative data for resending.

At the receiving terminal 3 (identical in construction with that of FIG. 5), when the quality of the received data has been judged as being equal to or less than a predetermined accumulation quality and when a sending request for alternative data equal to or more than the accumulation quality has been received by the quality-converting terminal 7, the quality-converting terminal 7 takes out the corresponding alternative data (differential data) from the differential-data accumulating section 73 and sends the takeout alternative data to the receiving terminal 3. It is thereby possible to minimize the necessary accumulation capacity of the differential-data accumulating section 73 and to reduce the traffic of the TCP/IP network 4.

In the foregoing examples, data to be sent from the sending terminal 2 (or 5) is AV data. Alternatively the data to be sent from the sending terminal 2 (or 5) may be of any other type as long as it enables real-time reproduction and accumulation.

Further, in the foregoing examples, timing of sending both an alternative-data sending request from the receiving terminal 3 (or 6) to the sending terminal 2 (or 5) and alternative data from the sending terminal 2 (or 5) to the receiving terminal 3 (or 6) in response to the request is controlled so as to shift backwardly in accordance with the status of load (sending error rate) of the TCP/IP network 4. This control may of course be omitted (the resending-request information accumulating section 36, 66 may be omitted).

Furthermore, in the first embodiment, the sending terminal 2 sends data in a selective one of two qualities, i.e. quality "1" and quality "2". The sending terminal 2 may of course send data in a selective one of more than two qualities. In this case, alternative data, for which the receiving terminal 3 requests the sending terminal 2 when the received data has been judged as satisfying a predetermined accumulation quality, may be data of any other quality as long as it at least satisfies the accumulation quality.

Assuming that there exist sending data of five qualities, i.e. quality "1" through quality "5", and that the accumulation quality of the received data to be satisfied at the receiving terminal 3 is quality "3", the receiving terminal 3 accumulates any data as long as it is of quality "1", quality "2" or quality "3". However, if qualities "1" through "5" change in sequence (it never happens that quality "1" changes to quality "3"), it should be preferable to request alternative data of the quality which has received by the time immediately before judged as satisfying the accumulation quality, causing a simple resending control of alternative data. Further, if it is necessary to make the accumulation quality at the receiving terminal 3 uniform to a particular constant quality, it is only required that requests are made to the sending terminal 2 for alternative data of such constant quality all the time.

Further, in the foregoing examples, a method of decreasing (increasing) the data sending rate (encoding rate) is employed in order to downgrade (upgrade) the quality of sending data with reducing (expanding) the usable network band. Alternatively, a method of decreasing (increasing) the resolution or any other method may be employed as long as it can reduce the sending data amount.

Furthermore, in the foregoing examples, accumulation of the received data is carried out at the receiving terminal 3 (or 6) (the receiving terminal 3 (or 6) is equipped with the received-data accumulating section 35, 35', 65). Alternatively, accumulation of the received data may be carried out at a terminal or apparatus other than the receiving terminal 3 (or 6).

Additionally, in the foregoing examples, the receiving terminal 3 (or 6) is used for the purpose of accumulating the received data. Alternatively the receiving terminal 3 (or 6) may be used for the purpose of receiving data other than the accumulation purpose. Namely, if received data of a particular time section does not satisfy a predetermined quality, the receiving terminal 3 (or 5) can obtain alternative data satisfying the predetermined quality for the particular time section by requesting the sending terminal 2 (5) or the agent terminal 7 for the alternative data.

Further, in the first and second embodiments, only one of discrimination of quality of received data (first embodiment) and detection of error of received data (second embodiment) is carried out. Alternatively, both quality discrimination and error detection may be carried out, whereupon a request may be made for sending alternative data of the received data if the received data has a quality less than a predetermined quality.

Furthermore, in the foregoing examples, the sending terminal 2 (or 5) and the receiving terminal 3 (or 6) are connected to the TCP/IP network 4. Alternatively, the sending terminal 2 (or 5) and the receiving terminal 3 (or 6) may be connected to a network according to another transmission system, such as an ATM (asynchronous transfer mode) network, and another protocol.

The present invention should by no mean be limited to the foregoing illustrated examples, and various other changes or modifications may be suggested without departing from the gist of the invention.

What is claimed is:

1. A data communication system having a data sending terminal which sends data to a network and changes data quality of the data sent to the network according to the network load and a receiving terminal which receive the data from the network and accumulates the received data, said system comprising:

at the data receiving terminal
(a) a received-data quality discriminating section for discriminating whether or not the received data from the data sending terminal satisfies a predetermined accumulation quality;
(b) an alternative-data sending requesting section for, if the received data of a particular time section does not satisfy the accumulation quality caused by the data sending terminal changing of the data quality as the result of discrimination by said received-data quality discriminating section, requesting the data sending terminal to send alternative data having a data quality higher than the data quality of the received data and satisfying the accumulation quality for the received data of the particular time section;
(c) a received-data accumulating section for accumulating the received data as judged satisfying the accumulation quality by said received-data quality discriminating section, and the alternative data as sent from the data sending terminal in response to the request by said alternative-data sending requesting section;

at the data sending terminal
(d) an alternative-data sending request receiving section for receiving, from said alternative-data sending requesting section of the data receiving terminal, the request for sending of alternative data satisfying the accumulation quality;
(e) a sending-data accumulating section for accumulating data to be sent to the data receiving terminal as alternative data to be sent to the data receiving terminal in response to the sending request from the data receiving terminal; and
(f) an alternative-data sending section for, upon receipt of the sending request by said alternative-data sending request receiving section, obtaining alternative data satisfying the accumulation quality from accumulated contents of said sending-data accumulating section and then sending the obtained alternative data to the data receiving terminal.

2. A data receiving terminal for receiving and accumulating data from a network which data is sent by data sending terminal, which sends data to the network and changes data quality of the data sent to the network according to the network load, comprising:

(a) a received-data quality discriminating section for discriminating whether or not the received data from the data sending terminal satisfies a predetermined accumulation quality;
(b) an alternative-data sending requesting section for, if the received data of a particular section does not satisfy the accumulation quality caused by the data sending terminal changing of the data quality as the result of discrimination by said received-data quality discriminating section, requesting the data sending terminal to send alternative data having a data quality higher than the data quality of the received data and satisfying the accumulation quality for the received data of the particular section; and
(c) a received-data accumulating section for accumulating the received data as judged satisfying the accumulation quality by said received-data quality discriminating section, and the alternative data as sent from the data sending terminal in response to the request by said alternative-data sending requesting section.

3. A data receiving terminal according to claim 2, wherein said alternative-data sending requesting section is a differential sending requesting section for requesting differential data satisfying the accumulating quality as the alternative data by combining the data of a section unsatisfying the accumulation quality with the already received data.

4. A data receiving terminal according to claim 2, wherein said received-data quality discriminating section discriminates the accumulation quality of the received data based on sending-data quality information about the quality of data to he sent from the data sending terminal.

5. A data receiving terminal according to claim 2, wherein said received-data quality discriminating section previously receives from the data sending terminal quality kind information about the kind of quality of data to be sent from the data sending terminal, and then determines a satisfactory accumulation quality based on said quality kind information.

6. A data sending terminal for sending data to a data receiving terminal, via a network and changing data quality of the data sent to the network according to the network load, comprising:

(a) an alternative-data sending request receiving section for receiving a sending request for alternative data having a data quality higher than the data quality of the sending data and satisfying the accumulation quality, which is transmitted from a data receiving terminal when the data receiving terminal determines that received data of a particular time section does not satisfy a predetermined accumulation quality caused by the data sending terminal changing of the data quality;

(b) a sending-data accumulating section for accumulating data to be sent to the data receiving terminal as alternative data to be sent to the data receiving terminal in response to the sending request received from the data receiving terminal; and (c) an alternative-data sending section for, upon receipt of the sending request by said alternative-data sending request receiving section, obtaining alternative data satisfying the accumulation quality from accumulated contents of said sending-data accumulating section and then sending the obtained alternative data to the data receiving terminal.

7. A data sending terminal according to claim 6, wherein:

said sending-data accumulating section is a differential-data accumulating section for accumulating differential data that is able to form sending data of a different quality as combined with the already sent data; and said alternative-data sending section is a differential-data sending section for, upon receipt of the sending request of differential data satisfying the accumulation quality, as combined with the already received data for the data of a section satisfying the accumulation quality, from the data receiving terminal obtaining, the differential data from said differential data accumulation section and then sending the obtained differential data to the data receiving terminal.

8. A data sending terminal according to claim 6, further comprising a sending-data quality information sending section for sending to the data receiving terminal sending-data quality information based on which the accumulation quality is to be discriminated at the data receiving terminal.

9. A data sending terminal according to claim 6, further comprising a quality kind information sending section for previously sending, to the data receiving terminal, quality kind information on the data able to be sent to the data receiving terminal, based on which information the satisfactory accumulation quality is to be determined at the data receiving terminal.

10. A data sending terminal according to claim 6, further an accumulation control section for deleting the sending data, which is accumulated in said sending-data accumulating section, from the sending data having lapsed a predetermined time.

11. A data receiving terminal for receiving and accumulating data from a network, said data sent by a data sending terminal which sends the data to the network and changes data quality of the data according to the network load, comprising:

(a) a received-data quality discriminating section for discriminating whether or not the received data satisfies a predetermined accumulation quality; and (b) an alternative-data sending requesting section for, if the received data of a particular time section does not satisfy the predetermined accumulation quality caused by the changing of the data quality of the data sent by the data sending terminal as the result of discrimination by said received-data quality discriminating section, requesting the data sending terminal to send alternative data having a data quality higher than the data quality of the received data and satisfying the predetermined accumulation quality for the received data of the particular time section.

12. A data sending terminal for sending data to a data receiving terminal via a network and changing a data quality of the data according to the network load comprising:

(a) an alternative-data sending request receiving section for receiving a request for sending of alternative data having a data quality higher than the data quality of the sending data and satisfying a predetermined accumulation quality for data of a particular time section to be sent from the data receiving terminal if the received data of the particular time section does not satisfy as the result of discrimination at the data receiving terminal caused by the changing of the data quality of the data sent by the data sending terminal; and (b) an alternative-data sending section for, upon receipt of the sending request by said alternative-data sending request receiving section, sending alternative-data satisfying the predetermined accumulation quality to the data receiving terminal.

13. A data transceiving method in a data communication system having a data sending terminal which sends data to a network and changes data quality of the data to be sent to the network according to the network load and a receiving terminal which receive the data from the network and accumulates the received data, comprising the steps of:

(a) requesting from the data receiving terminal to the data sending terminal, if the received data of a particular section at the data receiving terminal does not satisfy the accumulation quality caused by the changing of the data quality of the data sent by the data sending terminal, to send alternative data having a data quality higher than the data quality of the received data and satisfying the accumulation quality for the received data of the particular section; and (b) sending alternative-data from the data sending terminal to the data receiving terminal, having a data quality higher than the data quality of the sending data and satisfying the predetermined accumulation quality to the data receiving terminal, when the data sending terminal receives the sending request from the data receiving terminal.

* * * * *